No. 613,028. Patented Oct. 25, 1898.
C. DUVALL.
COTTON PICKER.
(Application filed Mar. 12, 1898.)
(No Model.) 2 Sheets—Sheet 1.
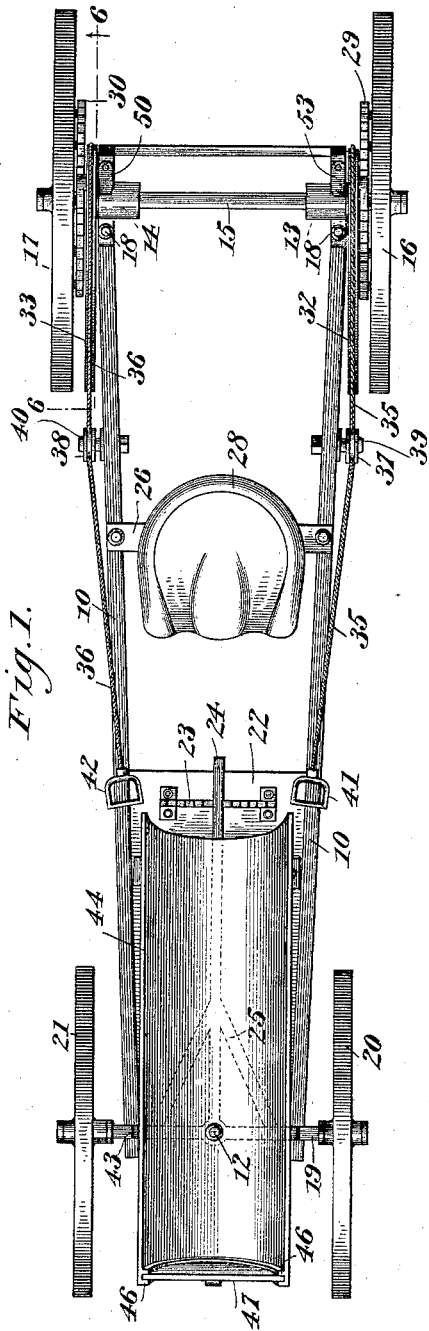
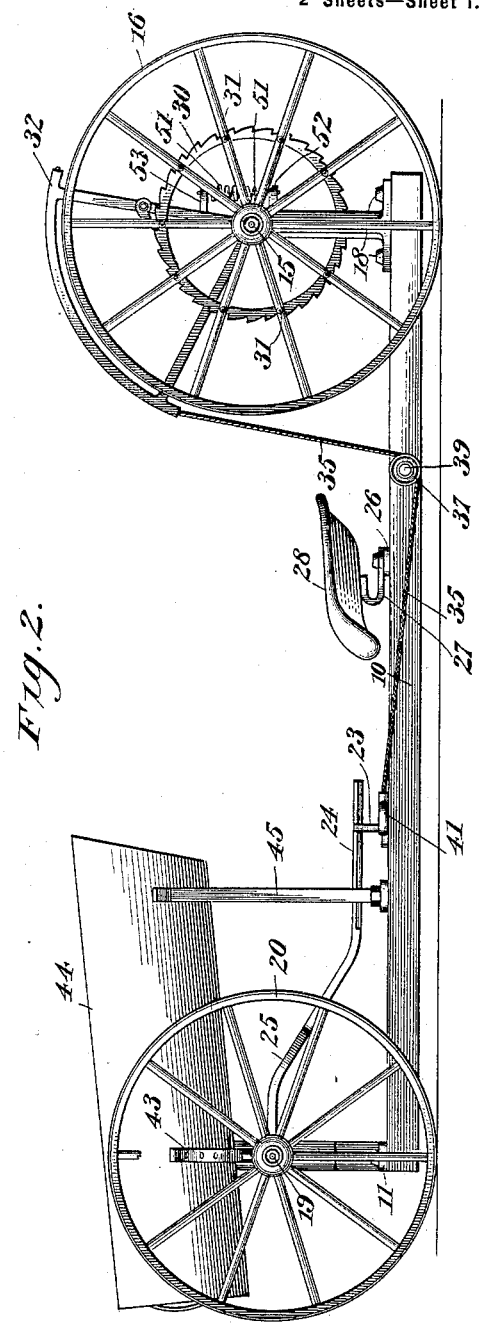
Witnesses
J. M. Witherow
Chas. E. Brock
Inventor
Charles Duvall,
by O'Mara &Co
Attorneys No. 613,028. Patented Oct. 25, 1898.
C. DUVALL.
COTTON PICKER.
(Application filed Mar. 12, 1898.)
(No Model.) 2 Sheets—Sheet 2.
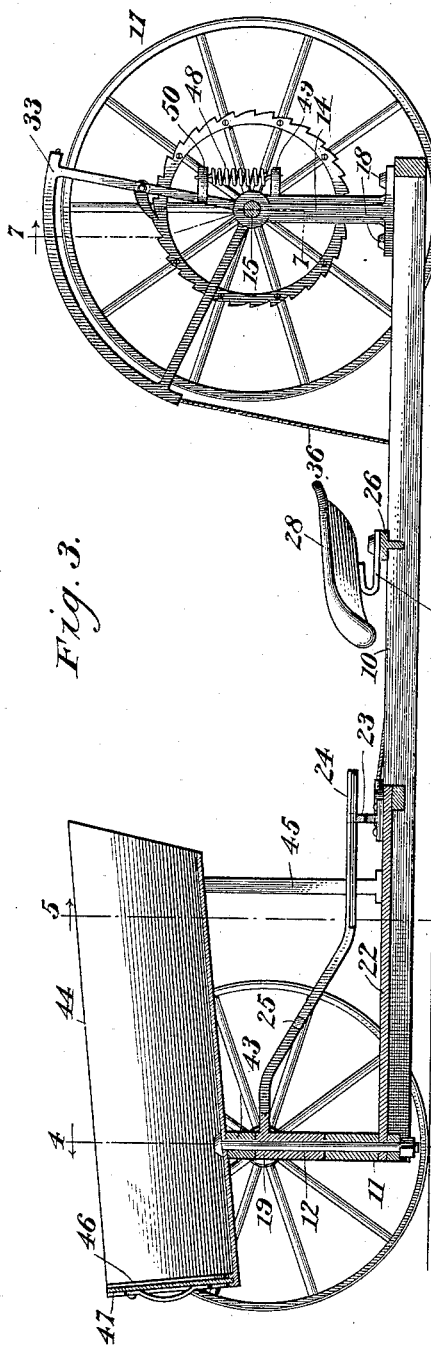
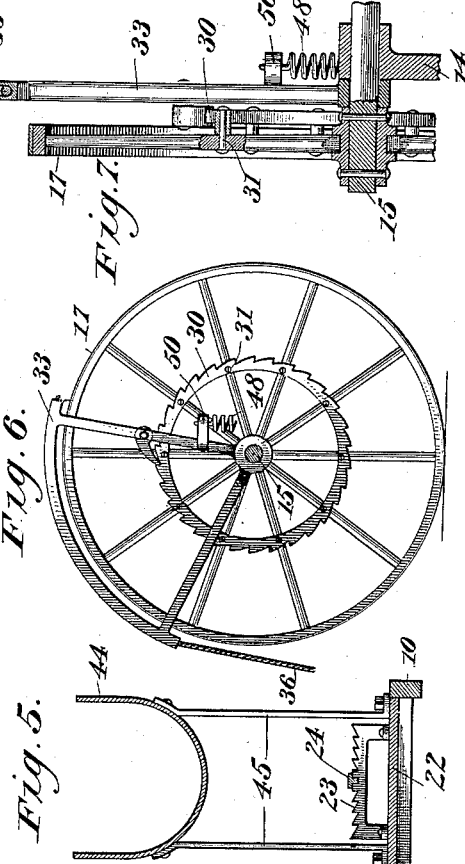
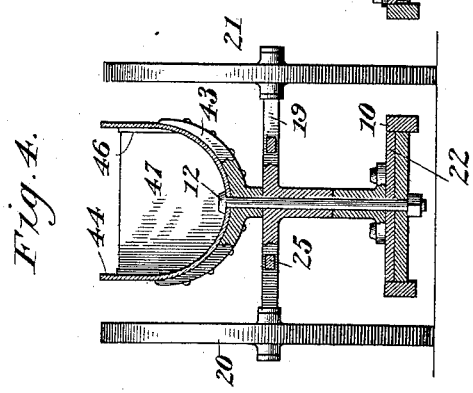
Inventor
Charles Duvall,
by Thuara Leg
Attorneys
Witnesses

UNITED STATES PATENT OFFICE.

CHARLES DUVALL, OF RINGWOOD, OKLAHOMA TERRITORY.

COTTON-PICKER.

SPECIFICATION forming part of Letters Patent No. 613,028, dated October 25, 1898.

Application filed March 12, 1898. Serial No. 673,615. (No model.)

*To all whom it may concern:*

Be it known that I, CHARLES DUVALL, a citizen of the United States, residing at Ringwood, in the county of Woods and Territory of Oklahoma, have invented a new and useful Cotton-Picker, of which the following is a specification.

My invention relates to cotton-pickers, and has for its object to provide an implement to be propelled by the picker seated thereon from place to place in the field while engaged in the operation of picking the cotton.

With this object in view my invention consists in a frame mounted upon hangers at each end depending from the axles of a front and rear pair of wheels, the front axle and wheels being mounted upon a king-bolt and provided with a steering-yoke to be operated by the feet of the picker, a seat being provided for the picker intermediate of the front and rear wheels and the rear wheels being fixed to their axle and provided with means extending to within reach of the feet of the picker seated on the machine, whereby such means may be operated to propel the machine, a receptacle for the picked cotton being mounted over the fixed axle.

My invention further consists in the improved construction, arrangement, and combination of parts hereinafter fully described, and afterward specifically pointed out in the appended claims.

In order to enable others skilled in the art to which my invention most nearly appertains to make and use the same, I will now proceed to describe its construction and operation, reference being had to the accompanying drawings, forming part of this specification, in which—

Figure 1 is a top plan view of a cotton-picker constructed in accordance with my invention. Fig. 2 is a side elevation thereof. Fig. 3 is a central vertical longitudinal sectional view. Fig. 4 is a section on the line 4 4 of Fig. 3. Fig. 5 is a section on the line 5 5 of Fig. 3. Fig. 6 is a section on the line 6 6 of Fig. 1. Fig. 7 is a section on the line 7 7 of Fig. 3.

Like numerals of reference mark the same parts wherever they occur in the different figures of the drawings.

Referring to the drawings by numerals, 10 indicates a horizontal frame suspended at a short distance above the ground from the lower ends of hangers depending from the front and rear axles, the front hanger being the king-bolt 12, and the rear hangers (two in number) being marked 13 and 14 and consisting of a main depending body provided with a hub at the top to act as a bearing for the rear axle 15, which is rigidly secured to the rear wheels 16 and 17. The lower ends of the hangers 13 and 14 are provided with horizontal flanges, through which the securing-bolts 18 are passed. The front axle 19 is mounted upon the king-bolt 12 as a pivot, and the front wheels 20 and 21 turn on the axle after the manner of ordinary wagon-wheels.

The frame 10 is a skeleton frame consisting of longitudinal and transverse bars, except the forward portion, which is filled in with a floor 22, upon which is mounted a rack 23 to engage with the rear end 24 of a yoke 25, secured to the front axle. Upon a cross-bar 26 of the frame 10, located just in front of the rear wheels, is mounted a spring-support 27, carrying at its upper end a seat 28, the support and seat being substantially of the form used on sulky-plows, harvesters, and other farming implements. Upon the axle 15, just inside of each rear wheel, is rigidly secured a ratchet-wheel, (marked 29 and 30,) said ratchet-wheels being secured to the spokes of the rear wheels 16 and 17 by pins or screws 31. Loosely mounted on the rear axle adjacent to the ratchet-wheels 29 and 30 are sectors 32 and 33, having their peripheries grooved and carrying pivoted pawls to engage the teeth of the ratchet-wheels 29 and 30 when the sectors are drawn forward. Cords 35 and 36, secured to the rear ends of these sectors at their peripheries, lie in the grooves in the peripheries and pass downward and forward under pulleys 37 and 38, mounted on short shafts 39 and 40, secured to the side bars of the frame 10. From the pulleys 37 and 38 the cords 35 and 36 pass forward to the rear edge of the floor 22, where they are provided with stirrups 41 and 42 to receive the feet of the picker sitting in the seat 28.

Mounted upon the king-bolt 12, above the front axle 19, is a yoke-frame 43, in which is seated a curved-bottom hopper 44, the rear end of which is open and is supported upon uprights 45, resting upon the floor 22. The rear end of the hopper 44 is provided with parallel inwardly-projecting flanges 46, between which a tail-board 47 may be seated when desired.

A spring 48 has its lower end secured to the lug 49, projecting from the hanger 14, and its upper end connected to a similar lug 50, projecting from the sector 33, the tendency of the spring being to draw the lugs toward each other and thus maintain the sector in its rearmost position. A like spring 51 connects lugs 52 and 53, projecting rearward from the hanger 13 and sector 32, tending to maintain the sector 32 in its rearmost position.

The construction of my invention will be readily understood from the foregoing description, and its operation may be described as follows: The various parts of the device being assembled and secured together in the manner described, the picker, sitting in the seat 28, places his feet in the stirrups 41 and 42, and by pushing them forward, either simultaneously or alternately, will draw one or both of the sectors 32 and 33 forward, the sector turning on the rear axle as a pivot, and by means of the engagement of the pawl 34 with the teeth of the ratchet-wheel will cause the ratchet-wheel, the rear axle, and the rear wheel to be rotated in a forward direction, thus propelling the machine to any desired position to facilitate the operation of picking. During this operation on account of the flexibility of the cords 35 and 36 the feet of the picker are free to be moved, so that he can operate the yoke 25 by contact of his feet with the end 24 thereof to move the yoke from side to side and engage the end 24 with the teeth of the rack 23 to secure it in any adjusted position. The yoke being rigidly secured to the front axle, these two parts will be operated together, the axle being moved with the yoke to steer the device in any direction desired. After each forward movement of the feet of the picker the sectors are returned to their original positions by the action of the springs 48 and 51. When the hopper has been filled with the cotton, it may be emptied out of the forward end into a bag stretched over that end by removing the end-gate 47.

The advantages attending the use of my invention will be readily understood from the foregoing description, taken in connection with the drawings. By its use the operation of picking will be greatly facilitated and much of the fatigue attending the performance of such work in the usual manner will be avoided, thereby enabling the picker to perform a much heavier task than is now possible.

While I have illustrated and described the best means now known to me for carrying out my invention, I do not wish to be understood as restricting myself to the exact details of construction shown and described, but hold that any slight changes or variations such as might suggest themselves to the ordinary mechanic would properly fall within the limit and scope of my invention.

Having thus fully described my invention, what I claim as new, and desire to secure by Letters Patent of the United States, is—

1. A cotton-picker comprising a framework mounted upon front and rear wheels, a hopper for receiving the cotton mounted over the front wheels, a seat mounted on the framework intermediate the wheels, and means connected with the rear wheels for propelling the device by means of the feet of the operator sitting in the seat, substantially as described.

2. A cotton-picker comprising a framework, front and rear wheels and axles supporting said framework, the rear wheels being secured to their axle, a hopper mounted over the front wheels for receiving the cotton, a seat mounted on the frame intermediate the wheels, ratchet-wheels secured to the rear wheel, sectors secured loosely on the rear axle, and cords secured to the sectors and provided with stirrups at their free ends to receive the feet of the operator sitting in the seat, substantially as described.

3. The combination in a cotton-picker, of a framework mounted on hangers depending from the front and rear axles, the rear wheels being fixed upon the axles, a seat mounted upon the frame intermediate of the wheels, ratchet-wheels secured to the rear wheels, sectors loosely mounted on the rear axle, pawls pivoted on the sectors to engage the ratchet-wheels during the forward movement of the sectors, lugs projecting rearwardly from the sectors and hangers, springs connecting the lugs of the sectors with those of the hangers, and cords secured to the sectors and carried forward and provided with stirrups at their forward ends within reach of the feet of the operator sitting in the seat, substantially as described.

4. The combination in a cotton-picker, of front and rear wheels and axles, hangers depending therefrom, a framework connected to and supported at the lower end of said hangers, a yoke-frame or bracket centrally mounted on the front axle, a hopper supported upon said yoke a king-bolt passing through the hopper, yoke-frame, front axle, hanger and framework, pivotally securing these parts together, and standards raised on the framework and supporting the rear end of the yoke, substantially as described.

5. The combination in a cotton-picker, of front and rear wheels and axles, hangers depending from the axles, a skeleton framework carried at the lower ends of said hangers, a floor in the forward portion of said framework, a king-bolt passing through the front axle upon which the axle turns, a steering-yoke projecting rearwardly from the front axle, a seat mounted on the framework in front of the rear wheels, and a rack mounted upon the floor in position to engage the rear end of the steering-yoke, the rack and steering-yoke being located to bring the latter within reach of the feet of the operator sitting in the seat, substantially as described.

CHARLES DUVALL.

Witnesses:
F. E. WATT,
V. J. CONAGHAN.